UNITED STATES PATENT OFFICE.

LOUIS PANAGIOTI ELEUTERIUS, OF NEW ORLEANS, LOUISIANA.

IMPROVEMENT IN CONFECTIONS.

Specification forming part of Letters Patent No. 125,446, dated April 9, 1872.

Specification describing a certain compound, called "Turkish Rahat Locourn," invented by LOUIS PANAGIOTI ELEUTERIUS, of the city of New Orleans, in the parish of Orleans and State of Louisiana, to be used as a confection.

The nature of the confection of the said ELEUTERIUS consists in mixing white or crushed sugar with corn-starch or arrow-root, or both, with gum-mastic, flavored with essences, according to fancy, or with almonds, and colored with any coloring-matter, according to taste.

To prepare the confection, take the following proportions: To eight pounds of sugar take one pound of starch or arrow-root and about two ounces of gum-mastic; then add pure water sufficient to reduce to a pulp or paste; after which the same is cooked over a slow fire for about two hours, constantly being stirred with an implement. When the paste has thus obtained a proper consistency it is taken off and the flavoring and perfuming matters are added, when the mass is poured into shallow molds to cool. When it cools, and thus assumes the proper consistency for use, it is carved into such shapes as convenient, or it may be sold and used in cakes or sheets.

I claim—

The confection composed of sugar, starch or arrow-root, gum-mastic, and flavoring-matter, as set forth.

New Orleans, Louisiana, February 19, 1872.

LOUIS PANAGIOTI ELEUTERIUS.

Witnesses:
THOS. S. COOLEY,
ROBERT ARKINSON.